United States Patent
Park

(10) Patent No.: US 9,915,026 B2
(45) Date of Patent: *Mar. 13, 2018

(54) CORE-FREE THERMOPLASTIC POLYURETHANE YARN FORMED WITH MASTERBATCH AND METHOD FOR MANUFACTURING SAME

(71) Applicant: Heedae Park, Busan (KR)

(72) Inventor: Heedae Park, Busan (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/190,503

(22) Filed: Jun. 23, 2016

(65) Prior Publication Data

US 2017/0370044 A1    Dec. 28, 2017

(51) Int. Cl.
*C08J 3/20* (2006.01)
*D06M 15/564* (2006.01)
*C08K 3/36* (2006.01)
*C08J 3/22* (2006.01)

(52) U.S. Cl.
CPC ........... *D06M 15/564* (2013.01); *C08J 3/226* (2013.01); *C08K 3/36* (2013.01); *C08J 2375/04* (2013.01)

(58) Field of Classification Search
CPC .. C09D 175/06; C09D 175/08; D06M 15/564
See application file for complete search history.

(56) References Cited

U.S. PATENT DOCUMENTS

| | | | |
|---|---|---|---|
| 2014/0308454 A1* | 10/2014 | Park | C09D 175/04 427/434.6 |
| 2015/0211175 A1* | 7/2015 | Hino | D04H 1/54 428/394 |

* cited by examiner

*Primary Examiner* — Hannah Pak
(74) *Attorney, Agent, or Firm* — Park & Associates IP Law, P.C.

(57) ABSTRACT

The present invention relates to masterbatches for a TPU yarn and a method for manufacturing a TPU yarn using the same wherein while TPU is not coated onto the surface of a polyester or nylon yarn, unlike the above-mentioned prior arts, the masterbatches are made by compounding the TPU and nano silica, and next, they are compounded with TPU, so that the compounded material is melted and extruded through an extruder for yarn processing, thereby manufacturing a TPU yarn having no core.

2 Claims, No Drawings

CORE-FREE THERMOPLASTIC POLYURETHANE YARN FORMED WITH MASTERBATCH AND METHOD FOR MANUFACTURING SAME

FIELD OF THE INVENTION

The present invention relates to masterbatches for a thermoplastic polyurethane (hereinafter, referred to as 'TPU') yarn and a method for manufacturing a TPU yarn using the same, and more particularly, to masterbatches for a TPU yarn and a method for manufacturing a TPU yarn using the same wherein the masterbatches are made by compounding nano silica and TPU so that the TPU yarn having a thickness of 50 denier or under can be manufactured continuously, without any break.

BACKGROUND OF THE INVENTION

As well known, yarns for industrial uses or shoe upper uses are generally used with yarns such as polyester, nylon, acryl resin and the like. The fabrics processed with the yarns disadvantageously have low durability, low abrasion resistance, and bad adhesion force, and accordingly, they are not adequate for high functional materials for shoe fabrics.

So as to solve such problems, currently, a coated yarn, which is made by coating thermoplastic resin onto the surface of yarn, is suggested to enhance the strength of yarn. The coated yarn is generally processed in such a manner that the thermoplastic resin such as PVC, PP or TPU is coated onto the yarn like polyester or nylon through dies of a general extruder.

In case of using the typical thermoplastic resin, however, it is hard to adjust the amount of thermoplastic resin coated, and particularly, it is very hard to coat a small amount of thermoplastic resin, so that the coated yarn has a thickness of more than 300 denier, thereby causing durability and abrasion resistance to be all deteriorated.

So as to solve the above-mentioned problems, the inventor has studied and developed a method for manufacturing coated yarn, compound for coated yarn, TPU coated yarn and so on from 2012 up to now, as suggested in Korean Patent Registration No. 10-1341054 (entitled 'method for manufacturing coated yarn' and dated on Dec. 13, 2013), Korean Patent Registration No. 10-1530149 (entitled 'composition of compound for coated yarn having pore' and dated on Jun. 19, 2015), Korean Patent Registration No. 10-1318135 (entitled 'composition of thermoplastic polyurethane compound for coated yarn' and dated on Oct. 15, 2013), Korean Patent Registration No. 10-1341055 (entitled 'composition of thermoplastic polyurethane yarn and method for manufacturing the same' and dated on Dec. 13, 2013).

According to the prior arts, coated yarns have excellent abrasion resistance, adhesion force, water resistance, and molding performance and further have relatively low thicknesses. In case of the coated yarns with cores like polyester or nylon, however, there is a limitation in their thickness, so that it is impossible to manufacture a coated yarn having a substantially low thickness, desirably, a thickness of 50 denier or under.

Further, the TPU coated yarns as suggested in the prior arts do not have high viscosity according to the characteristics of TPU, unlike polyester or nylon, so that a viscosity agent is necessarily used to perform gentle extrusion processing. In case of a mono-filament yarn having a relatively high thickness as a sole yarn unlike the TPU coated yarns, silica having a general size is used as the viscosity agent, but in case of a mono-filament yarn or multi-filament yarn having a thickness less than 50 denier, it should be made to a relatively low thickness, so that the silica having the general size cannot be used as the viscosity agent.

SUMMARY OF THE INVENTION

Accordingly, the present invention has been made in view of the above-mentioned problems occurring in the prior art, and it is an object of the present invention to provide masterbatches for a TPU yarn and a method for manufacturing a TPU yarn using the same that adopts nano silica as a viscosity agent adequate for processing the TPU yarn having a relatively low thickness, thereby achieving desired processing and properties.

It is another object of the present invention to provide masterbatches for a TPU yarn and a method for manufacturing a TPU yarn using the same that is capable of manufacturing the TPU yarn having a thickness of 50 denier or under.

To accomplish the above-mentioned objects, according to a first aspect of the present invention, there are provided masterbatches for a TPU yarn including: TPU; and nano silica having particle sizes of 30 nm or under (desirably, in the range of 5 to 30 nm).

To accomplish the above-mentioned object, according to a second aspect of the present invention, there is provided a method for manufacturing a TPU yarn, including the steps of: compounding TPU and nano silica having particle sizes in the range of 5 to 30 nm with each other to manufacture pellet type masterbatches; and compounding the masterbatches and the TPU, injecting a general extruder for yarn processing, melting and extruding the compounded material, and manufacturing the TPU yarn having a thickness of 50 denier or under.

DETAILED DESCRIPTION OF THE INVENTION

Hereinafter, a preferred embodiment of the invention will be explained in detail. In the description, a representative embodiment of the invention will be suggested to achieve the above-mentioned objects of the invention. Other embodiments of the invention will be suggested through the description of the invention.

According to the present invention, TPU is not coated onto the surface of a polyester or nylon yarn, unlike the above-mentioned prior arts. According to the present invention, masterbatches are made by compounding TPU and nano silica, and next, they are compounded with TPU, so that the compounded material is melted and extruded through an extruder for yarn processing, thereby manufacturing a TPU yarn having no core.

Hereinafter, an explanation on a preferred embodiment of the present invention will be in detail given.

First Embodiment

The present invention relates to a method for manufacturing a TPU yarn solely, while TPU is not coated onto the surface of a polyester or nylon yarn. At this time, above-mentioned TPU yarn is used for processing a mono-filament yarn or a multi-filament yarn.

The TPU used in the present invention is virgin TPU, and the virgin TPU is made by polymerizing polyester polyol, polyether polyol, polycarprolactone or the like with aromatic isocyanate or aliphatic isocyanate through short chain glycol (for example, 1,4 butanediol) as a chain extender.

According to the present invention, further, the TPU can be used only with TPU scraps remaining after the high frequency processing of the TPU used for shoes except the virgin TPU or remaining after hot melt processing, and otherwise, the TPU is used by mixing the TPU scraps and the virgin TPU.

According to the present invention, on the other hand, while the TPU is not coated onto the surface of a polyester or nylon yarn, the TPU yarn having no core is manufactured. Accordingly, the TPU yarn is continuously elongated and extruded, without any break, thereby achieving the improvement in productivity, and of course, a viscosity agent for improving light extinction or an inorganic material (Talc, $CaCO_3$) for conducting thickening is used.

Particularly, silica powder as the viscosity agent is desirably concentrated and compounded with TPU to make masterbatches. At this time, it is impossible to obtain the TPU yarn having a relatively low thickness of 50 denier or under with silica powder having general sizes, and accordingly, the masterbatches are made by compounding nano silica powder (desirably having particle sizes in the range of 5 to 30 nm) with TPU.

While the masterbatches are made by compounding nano silica powder with TPU, further, the content of the nano silica powder is not more than 40% by weight. If the content of the nano silica powder is more than 40% by weight, the silica powder is not compounded with the TPU, thereby failing to make the masterbatches and the TPU yarn. When the nano silica powder having particle sizes in the range of 5 to 30 nm is compounded with the TPU, accordingly, the content of the nano silica powder is maximum 40% by weight, and so as to manufacture the most desirable masterbatches, the content of the nano silica powder is 30% by weight.

Hereinafter, a method for manufacturing masterbatches by compounding the nano silica with the TPU and a method for manufacturing a TPU yarn having no core by using the masterbatches will be in more detail explained.

Method for Manufacturing Masterbatches According to the Present Invention

First step: The content of the above-suggested TPU (for example, virgin TPU, TPU scraps, or TPU made by mixing both of them) and the content of the nano silica having particle sizes of 30 nm or under (desirably, in the range of 5 to 30 nm) are measured. At this time, the content of the nano silica is not more than 40% by weight.

Second step: The nano silica and the TPU are injected into a general kneader and mixed at a speed with 20 to 30 rpm at a temperature in the range of 100 to 120° C.

Third step: The TPU mixed with the nano silica is cooled and pulverized to a diameter of less than 10 mm. Next, the pulverized TPU is injected into a general twin extruder. At this time, a temperature of the twin extruder is in the range of 150 to 200° C.

Fourth step: The compounded TPU through the twin extruder is injected into cooling water having a temperature in the range of 15 to 20° C. and made to the form of pellets.

Fifth step: The masterbatches made through the first to fourth steps, that is, the pellet type masterbatches are dried and annealed in a typical manner.

Method for Manufacturing TPU Yarn According to the Present Invention

According to the method for manufacturing the TPU yarn as will be in detail described below, TPU is not coated onto the surface of a polyester or nylon yarn, unlike the above-mentioned prior arts, and accordingly, the TPU yarn having no core is manufactured.

First step: The above-suggested TPU (for example, virgin TPU, TPU scraps, or TPU made by mixing both of them) and the masterbatches (made by compounding the nano silica and the TPU) are mixed with given contents and injected into a general twin extruder, and next, they are compounded with each other at a temperature in the range of 170 to 230° C.

Second step: The compounded pellets (that is, the pellets made by compounding the TPU and the masterbatches) are injected into a general yarn processing extruder and melted and extruded at a temperature in the range of 170 to 230° C.

Third step: The TPU yarn discharged from extruder dies is cooled in cooling water having a temperature in the range of 25 to 40° C.

Fourth step: The cooled yarn is elongated. At this time, the yarn is elongated maximum 7 times, but if elongated over 7 times, the yarn may break.

Fifth step: The elongated yarn is annealed in a heat chamber at a temperature of 150 to 160° C.

Sixth step: The annealed yarn is wound up, thereby finishing the manufacturing of the TPU yarn having 50 denier or under. That is, while polyester or nylon yarn corresponding to the core of the TPU yarn is not used, and of course, while the TPU is not coated onto the surface of the polyester or nylon yarn, only the TPU yarn having 50 denier or under is manufactured.

So as to check the physical properties of the TPU yarn manufactured according to the present invention, on the other hand, tests by the content of masterbatches compounded with the TPU have been carried out and the tested results are shown in the following Table 1.

That is, when the masterbatches (having 30% by weight of nano silica) of the present invention was compounded with the TPU, the masterbatches had the contents of 0 phr, 3 phr, 5 phr, 10 phr, and 20 phr, and at this time, viscosity variations, extrusion processing performance, and surface states were compared with each other. In this case, the TPU was used with polyester polyol having 75D shore hardness.

TABLE 1

| Test Grade | MFI (230° C., 2.16 kg) (g/10 min) | Tfb (° C.) | Melt Viscosity (Pas) 230° C. | 235° C. | Content of masterbatch |
|---|---|---|---|---|---|
| NS-75D-1 | 19.58 | 215.2 | 35580 | 11010 | 0 phr |
| NS-75D-2 | 16.83 | 216.3 | 31860 | 11450 | 3 phr |
| NS-75D-3 | 14.32 | 218.2 | 40950 | 12830 | 5 phr |
| NS-75D-4 | 8.35 | 222.3 | 44380 | 14030 | 10 phr |
| NS-75D-5 | 6.23 | 219.3 | 50570 | 16930 | 20 phr |

NS-75D-1, NS-75D-2, NS-75D-3, NS-75D-4, and NS-75D-5, which are listed in the test grade of Table 1, indicate the product names of TPU yarns, and in more detail, they indicate the product names of the TPU yarns containing 0 phr, 3 phr, 5 phr, 10 phr, and 20 phr masterbatches.

Referring to Table 1, the extrusion processing and the surface states of the TPU yarns is explained as below.

Firstly, the TPU yarn (product name: NS-75D-1), which did not contain 0 phr masterbatch according to the present invention thereinto, too flowed in the process of the extrusion to cause serious breaking and further had a rough surface.

Secondly, the TPU yarn (product name: NS-75D-2), which contained 3 phr masterbatches according to the present invention thereinto, flowed well in the process of the extrusion to cause breaking and further had a little rough surface.

Thirdly, the TPU yarn (product name: NS-75D-3), which contained 5 phr masterbatches according to the present invention thereinto, had a melt flow index of 14.32 g/10 min and a flow beginning temperature of 218.2° C., thereby providing good extrusion processing, and further, it had melt viscosity of 40,950 at a temperature of 230° C. and melt viscosity of 12,830 at a temperature of 235° C., thereby having no breaking in the process of extrusion and providing a good surface state.

Fourthly, the TPU yarn (product name: NS-75D-4), which contained 10 phr masterbatches according to the present invention thereinto, had a melt flow index of 8.35 g/10 min and a flow beginning temperature of 222.3° C., thereby providing good extrusion processing, and further, it had melt viscosity of 44,380 at a temperature of 230° C. and melt viscosity of 14,030 at a temperature of 235° C., thereby having no breaking in the process of extrusion and providing a good surface state.

Fifthly, the TPU yarn (product name: NS-75D-5), which contained 20 phr masterbatches according to the present invention thereinto, provided good extrusion processing, without having any breaking, but disadvantageously had a slippery surface state.

In manufacturing the TPU yarn through the compounding of the masterbatches and the TPU, it could be appreciated from the test results that most preferably, 5 to 10 phr masterbatches (having 30% by weight of nano silica) were compounded with the TPU. Further, if more than 20 phr masterbatches were compounded, it was found that blooming is occurred seriously on the TPU yarn.

On the other hand, the comparison results between the physical properties of the TPU yarn manufactured by using the nano silica according to the present invention and the physical properties of the TPU yarn manufactured by using general silica are listed in Table 2. That is, the TPU yarn manufactured using the masterbatches made by compounding the nano silica having the particle sizes in the range of 5 to 30 nm and the TPU is compared in detail through tests with the TPU yarn manufactured using the masterbatches made by compounding silica having the particle sizes in the range of 300 to 500 nm and the TPU.

TABLE 2

| Comparison items | General silica | Nano silica | Remarks |
|---|---|---|---|
| TPU grade | Sole TPU yarn (product name: NS-75D-10) | Sole TPU yarn (product name: NS-75D-4) | 10 phr masterbatches made with 30% by weight of general silica and nano silica |
| Silica particle size | 300 to 500 nm | 5 to 30 nm | There is no silica of less than 5 nm and yarn may break if silica of more than 30 nm is used |
| TPU MFI (melt flow index) | 7.3 | 8.35 | 230° C., 2.16 kgf |
| TPU Tfb (flow beginning temp.) | 224.5 | 222.3 | |
| TPU tensile strength | 250 kgf/cm² | 350 kgf/cm² | Injection molded sample use |
| TPU tear strength | 178 kgf/cm | 205 kgf/cm | Injection molded sample use |
| TPU specific gravity | 1.23 to 1.26 | 1.22 to 1.25 | g/cc |
| TPU hardness | 75 ± 3D | 75 ± 3A | Shore D |
| TPU yarn thickness | 50 denier | 50 denier | |
| TPU surface state | Very rough | Good | |
| Extrusion processing | Serious yarn breaking upon extrusion due to the size of silica to cause hard extrusion working | Good extrusion working, without having any yarn breaking | |

As appreciated from Table 2, in case of the TPU yarn manufactured using the masterbatches made by compounding general silica (having the particle sizes in the range of 300 to 500 nm) and the TPU, it had a rough surface state and low extrusion processing performance. Especially, the TPU yarn did not have a thickness of less than 50 denier.

Contrarily, in case of the TPU yarn manufactured using the masterbatches made by compounding the nano silica having the particle sizes in the range of 5 to 30 nm and the TPU, it had a good surface state and high extrusion processing performance, without any breaking.

As described above, the masterbatches for the TPU yarn and the method for manufacturing the TPU yarn according to the present invention can obtain the effects of the TPU coated yarn as well as manufacture the TPU yarn having a relatively low thickness of 50 denier or under.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A core-free thermoplastic polyurethane yarn formed with a masterbatch, wherein the masterbatch comprises thermoplastic polyurethane as a base polymer of the core-free thermoplastic polyurethane yarn, and silica nanopowder mixed to the thermoplastic polyurethane by melt extrusion, wherein the silica nanopowder has a particle size of 5 to 30 nm, wherein the core-free thermoplastic polyurethane yarn has a thickness of 50 denier or less.

2. The core-free thermoplastic polyurethane yarn of claim 1, wherein the masterbatch is formed in pellets.

* * * * *